(12) United States Patent
Popham et al.

(10) Patent No.: US 8,021,447 B2
(45) Date of Patent: Sep. 20, 2011

(54) HYDROGEN-PRODUCING ASSEMBLIES

(75) Inventors: Vernon Wade Popham, Bend, OR (US);
Robert A. Sorensen, Bend, OR (US);
Kyle Taylor, Bend, OR (US)

(73) Assignee: Idatech, LLC, Bend, OR (US)

(*) Notice: Subject to any disclaimer, the term of this patent is extended or adjusted under 35 U.S.C. 154(b) by 683 days.

(21) Appl. No.: 12/182,959

(22) Filed: Jul. 30, 2008

(65) Prior Publication Data
US 2010/0028223 A1 Feb. 4, 2010

(51) Int. Cl.
*B01J 7/00* (2006.01)
*B01J 8/00* (2006.01)
*B01J 19/00* (2006.01)
*F28D 21/00* (2006.01)

(52) U.S. Cl. ........... 48/61; 48/127.9; 422/187; 422/211; 422/198; 422/202

(58) Field of Classification Search ........... 48/61, 127.9; 422/187, 211, 198, 202
See application file for complete search history.

(56) References Cited

U.S. PATENT DOCUMENTS

| | | |
|---|---|---|
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,522,019 A | 7/1970 | Buswell et al. |
| 3,655,448 A | 4/1972 | Setzer |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,468,235 A | 8/1984 | Hill |
| 5,401,589 A | 3/1995 | Palmer et al. |
| 5,432,710 A | 7/1995 | Ishimaru et al. |
| 5,637,414 A | 6/1997 | Inoue et al. |
| 5,861,137 A | 1/1999 | Edlund |
| 5,997,594 A | 12/1999 | Edlund et al. |
| 6,083,637 A | 7/2000 | Walz et al. |
| 6,221,117 B1 | 4/2001 | Edlund et al. |
| 6,319,306 B1 | 11/2001 | Edlund et al. |
| 6,376,113 B1 | 4/2002 | Edlund et al. |
| 6,383,670 B1 | 5/2002 | Edlund et al. |
| 6,494,937 B1 | 12/2002 | Edlund et al. |
| 6,495,277 B1 | 12/2002 | Edlund et al. |
| 6,562,111 B2 | 5/2003 | Edlund et al. |
| 7,368,194 B2 | 5/2008 | Dickman et al. |
| 2004/0223908 A1 | 11/2004 | Holladay et al. |
| 2007/0028860 A1* | 2/2007 | Hemsath ............................ 123/3 |
| 2007/0224565 A1 | 9/2007 | Briselden |
| 2007/0237691 A1* | 10/2007 | Takata et al. .................. 422/188 |

\* cited by examiner

*Primary Examiner* — Timothy Vanoy
(74) *Attorney, Agent, or Firm* — Dascenzo Intellectual Property Law, P.C.

(57) ABSTRACT

Hydrogen-producing fuel processing assemblies for producing hydrogen gas. The assemblies include a catalyst chamber, a heat source adapted to heat the catalyst chamber, a hydrogen-producing region within the catalyst chamber adapted to produce hydrogen gas from a feed stream, and a conductive guide structure within the catalyst chamber adapted to conduct and distribute heat from the heat source within the hydrogen-producing region and to direct fluid through the hydrogen-producing region. In some embodiments, the conductive guide structure includes a helical member. In some embodiments, the assembly further includes a vaporization region within the catalyst chamber. In some embodiments, the fuel processing assembly is adapted to produce hydrogen gas via a steam reforming or other endothermic reaction.

25 Claims, 2 Drawing Sheets

HYDROGEN-PRODUCING ASSEMBLIES

FIELD OF THE DISCLOSURE

The present disclosure is related generally to hydrogen-producing assemblies that are adapted to produce primarily hydrogen gas, and more particularly to hydrogen-producing assemblies that are adapted to produce hydrogen gas via a steam reforming reaction.

BACKGROUND OF THE DISCLOSURE

Purified hydrogen gas is used in the manufacture of many products including metals, edible fats and oils, and semiconductors and microelectronics. Purified hydrogen gas is also an important fuel source for many energy conversion devices. For example, fuel cells use purified hydrogen gas and an oxidant to produce an electrical potential. Various processes and devices may be used to produce the hydrogen gas that is consumed by the fuel cells. One such process is steam reforming, in which a reforming catalyst is used to produce hydrogen gas from a carbon-containing feedstock and water.

Steam reforming of water and a carbon-containing feedstock to produce hydrogen gas is an endothermic reaction. Hydrogen-producing steam reforming reactions are typically performed at elevated temperatures, such as temperatures of at least 200° C., and more typically at least 350° C. The desired steam reforming temperature, or range of temperatures, will tend to vary according to a variety of factors, including the composition of the carbon-containing feedstock and the steam reforming catalyst being utilized to catalyze the hydrogen-producing steam reforming reaction. As an illustrative example, steam reforming of methanol to produce hydrogen gas is typically performed at a temperature of 350-500° C., while many hydrocarbons are reformed to produce hydrogen gas at a temperature of 700-900° C.

DETAILED DESCRIPTION AND BEST MODE OF THE DISCLOSURE

Figure 1:
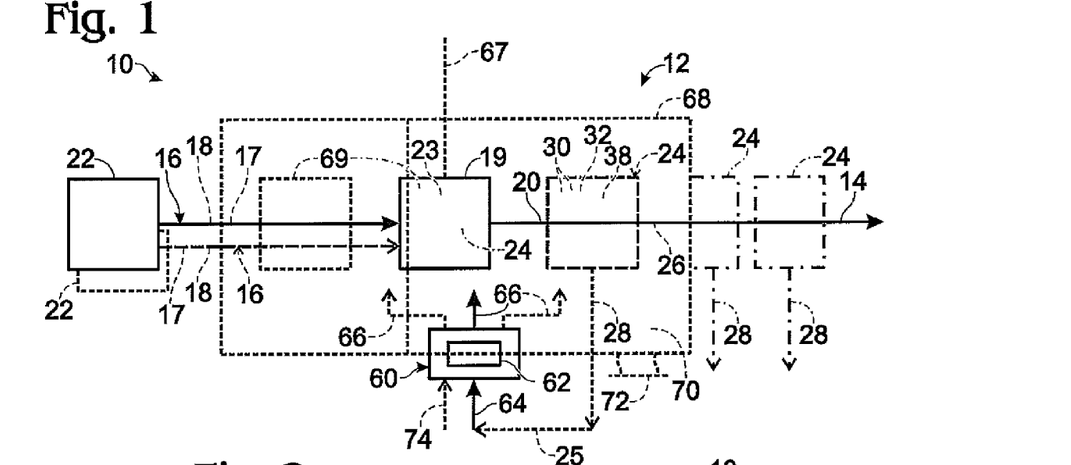
FIG. 1 is a schematic diagram of fuel-processing assemblies including hydrogen-producing assemblies according to the present disclosure.

Fuel-processing assemblies according to the present disclosure are schematically illustrated in FIG. 1 and indicated generally at 10. Fuel-processing assembly 10 includes a hydrogen-producing fuel processor 12 that is adapted to produce a product hydrogen stream 14 containing hydrogen gas, and in many embodiments at least substantially pure hydrogen gas, from one or more feed streams 16. Fuel processors 12 also may be referred to as hydrogen-producing assemblies or hydrogen-generating assemblies. The one or more feed streams 16 are delivered to the fuel processor by one or more feedstock delivery systems 22. A feed stream includes at least one carbon-containing feedstock 18 and also may include water 17. Illustrative, non-exclusive examples of suitable carbon-containing feedstocks 18 include at least one hydrocarbon or alcohol. Illustrative, non-exclusive examples of suitable hydrocarbons include diesel, kerosene, gasoline, and the like. Illustrative, non-exclusive examples of suitable alcohols include methanol, ethanol, and polyols, such as ethylene glycol and propylene glycol.

When the carbon-containing feedstock is miscible with water, the carbon-containing feedstock may be, but is not required to be, delivered to the fuel processor in the same feed stream as the water component of feed stream 16, such as shown in FIG. 1 by reference numerals 17 and 18 pointing to the same feed stream 16. For example, when the fuel processor receives a feed stream containing water and a water-soluble alcohol, such as methanol, these components may be premixed and delivered as a single feed stream. As an illustrative, non-exclusive example, a reforming feed stream may contain approximately 25-75 vol % methanol or ethanol or another suitable water-miscible carbon-containing feedstock, and approximately 25-75 vol % water. For feed streams formed (at least substantially) of methanol and water, the streams will typically contain approximately 50-75 vol % methanol and approximately 25-50 vol % water. Feed streams 16 containing ethanol or other water-miscible alcohols will typically contain approximately 25-60 vol % alcohol and approximately 40-75 vol % water. For hydrogen-generating assemblies that utilize steam reforming or autothermal reforming reactions to produce hydrogen gas, an illustrative, non-exclusive example of a particularly well-suited feed stream contains 69 vol % methanol and 31 vol % water, although other compositions and carbon-containing feedstocks may be used without departing from the scope of the present disclosure. Typically the molar ratio of water to carbon in the feed stream(s) will be approximately 1:1 to 3:1. Mixtures of water and methanol will often be delivered at or near a 1:1 molar ratio (31 vol % water, 69 vol % methanol), while mixtures of hydrocarbons or other alcohols will often be delivered at a molar ratio greater than 1:1 water-to-carbon. Additional illustrative, non-exclusive examples of water-to-carbon ratios that may be used for steam reforming of methanol and water include ratios that are greater than 1:1, such as ratios in the range of 1.1:1-1.5:1.

It is within the scope of the present disclosure that such a feed stream that contains both water and at least one carbon-containing feedstock may be used as the feed stream for a hydrogen-producing region (discussed below) and as a combustible fuel stream for a heating assembly (when present) that is adapted to heat at least the hydrogen-producing region of the fuel processing assembly, such as to a suitable hydrogen-producing temperature. It is also within the scope of the present disclosure that more than one feed stream 16 may be used and that these feed streams may contain the same or different feedstocks. This is schematically illustrated by the inclusion of a second feed stream 16 in dashed lines in FIG. 1. Similarly, FIG. 1 also illustrates in dashed lines that each feed stream 16 may (but is not required to be) associated with a different feedstock delivery system 22, or portions thereof. For example, when more than one feedstock delivery system 22 is utilized, the systems may be (but are not required to) draw at least a portion of their outlet streams from a common supply. When feed stream 16 contains two or more components, such as a carbon-containing feedstock and water, the components may be delivered in the same or different feed streams.

Hydrogen-producing fuel processor 12 includes any suitable device, or combination of devices, adapted to produce via chemical reaction predominately hydrogen gas from one or more feed streams 16. Accordingly, fuel processor 12 includes a hydrogen-producing region 19, in which an output stream 20 containing hydrogen gas is produced by utilizing any suitable hydrogen-producing mechanism(s). Output stream 20 includes hydrogen gas as at least a majority component. Output stream 20 may include one or more additional gaseous components, and thereby may be referred to as a mixed gas stream, which contains hydrogen gas as its majority component, and which also contains other gases as minority components.

An illustrative, non-exclusive example of a suitable mechanism for producing hydrogen gas from a feed stream is steam reforming, in which a reforming catalyst is used to produce hydrogen gas from at least one feed stream 16 containing a carbon-containing feedstock 18 and water 17. In a steam reforming process, hydrogen-producing region 19 contains a suitable steam reforming catalyst 23, as indicated in dashed lines in FIG. 1. In such an embodiment, the fuel processor may be referred to as a steam reformer, hydrogen-producing region 19 may be referred to as a reforming region, and output, or mixed gas, stream 20 may be referred to as a reformate stream, and/or as a reformate mixed-gas stream. As used herein, a reforming region includes any hydrogen-producing region utilizing a steam reforming hydrogen-producing mechanism. Illustrative, non-exclusive examples of suitable steam reforming catalysts include copper-zinc formulations of low temperature shift catalysts and a chromium formulation sold under the trade name KMA by Sud-Chemie, although others may be used. Additional illustrative, non-exclusive examples of suitable catalysts for catalyzing the production of hydrogen gas from methanol and water via a steam reforming reaction are disclosed in U.S. Patent Application Publication No. 2006/0236607A1, the complete disclosure of which is hereby incorporated by reference. The other gases that may be present in the reformate stream include carbon monoxide, carbon dioxide, methane, steam, and/or unreacted carbon-containing feedstock.

Another illustrative, non-exclusive example of a suitable hydrogen-producing reaction that may be utilized in a hydrogen-producing region 19 of a fuel processor 12 according to the present disclosure is autothermal reforming, in which a suitable autothermal reforming catalyst is used to produce hydrogen gas from water and a carbon-containing feedstock in the presence of air. When autothermal reforming is used, the fuel processor further includes an air delivery assembly 67 that is adapted to deliver an air stream to the hydrogen-producing region, as indicated in dashed lines in FIG. 1. Autothermal hydrogen-producing reactions utilize a primary endothermic steam reforming reaction that is utilized in conjunction with an exothermic partial oxidation reaction, which generates heat within the hydrogen-producing region upon initiation of the initial hydrogen-producing reaction. Further illustrative, non-exclusive examples of other suitable mechanisms for producing hydrogen gas include pyrolysis and catalytic partial oxidation of a carbon-containing feedstock, in which case the feed stream does not contain water.

At least hydrogen-producing region 19 of fuel-processing assembly 10 is designed to be operated at an elevated temperature when being utilized to produce hydrogen gas for product hydrogen stream 14. This hydrogen-producing temperature may be achieved and/or maintained in hydrogen-producing region 19 through the use of a heating assembly 60 or other suitable heat source. Hydrogen-producing steam reformers typically operate at temperatures in the range of 200-900° C. Temperatures outside of this range are within the scope of the present disclosure. When the carbon-containing feedstock is methanol, the steam reforming reaction will typically operate in a temperature range of approximately 200-500° C. Illustrative subsets of this range include 350-450° C., 375-425° C., 375-400° C., and 400-450° C. When the carbon-containing feedstock is a hydrocarbon, ethanol, or another alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C.

In some fuel processing assemblies according to the present disclosure, heating assembly 60 includes a burner assembly 62 and may be referred to as a combustion-based, or combustion-driven, heating assembly. In a combustion-based heating assembly 60, the heating assembly is adapted to receive at least one fuel stream 64 and to combust the fuel stream in the presence of air to provide a hot combustion stream 66 that may be used to heat at least the hydrogen-producing region 19 of the fuel processor. Combustion stream 66 also may be referred to as a heated exhaust stream. Air may be delivered to the heating assembly via an air stream 74; however, it is within the scope of the disclosure for the air stream to additionally or alternatively be delivered to the heating assembly with fuel stream 64 and/or drawn from the environment within which the heating assembly is utilized.

It is within the scope of the present disclosure that combustion stream 66 may additionally or alternatively be used to heat other portions of the fuel processing assembly and/or fuel cell systems with which heating assembly 60 is used. It is also within the scope of the present disclosure that other configurations and types of heating assemblies 60 may be utilized. As an illustrative example, a heating assembly 60 may be an electrically powered heating assembly that is adapted to heat at least the hydrogen-producing region of the fuel processing assembly by generating heat using at least one heating element, such as a resistive heating element. Therefore, it is not required in all embodiments that heating assembly 60 receive and combust a combustible fuel stream to heat hydrogen-producing region 19 to a suitable hydrogen-producing temperature. Illustrative, non-exclusive examples of suitable heating assemblies that may be used with fuel processing assemblies according to the present disclosure are disclosed in U.S. Patent Application Publication Nos. 2003/0192251, 2003/0223926, and 2006/0272212, the complete disclosures of which are hereby incorporated by reference.

In FIG. 1, fuel processor 12 is shown including an optional shell 68 in which at least the hydrogen-producing region is contained. Shell 68, which also may be referred to as a housing, enables the components of the steam reformer or other fuel processing mechanism to be moved as a unit. It also protects the components of fuel processor 12 from damage by providing a protective enclosure and reduces the heating demand of the fuel-processing assembly because the components of the fuel processor may be heated as a unit. Shell 68 may, but does not necessarily, include insulating material 70, such as a solid insulating material, blanket insulating material, and/or an air-filled cavity. It is within the scope of the present disclosure, however, that the fuel processor may be formed without a housing or shell. When fuel processor 12 includes insulating material 70, the insulating material may be internal the shell, external the shell, or both. When the insulating material is external a shell containing the reforming region and/or other components, fuel processor 12 further may include an outer cover or jacket 72 external the insulation, as schematically illustrated in FIG. 1. It is within the scope of the present disclosure that the fuel-processing assembly may be implemented with a different shell, with a shell that includes additional components of the fuel-processing assembly, including feedstock delivery system 22 (or portions thereof, and/or includes additional components of the processing system and/or an associated fuel cell stack. It is also within the scope of the present disclosure that a fuel processing assembly 10 may not include a shell 68. It is further within the scope of the present disclosure that one or more of the components of fuel-processing assembly 10 may either extend beyond the shell or be located external at least shell 68.

In FIG. 1, heating assembly 60 is shown in an overlapping relationship with fuel processor 12 to graphically represent that it is within the scope of the present disclosure that the heating assembly may be located partially or completely within fuel processor 12, such as being at least partially within shell 68, and/or that at least a portion, or all, of the heating assembly may be located external the fuel processor. When the heating assembly is external to the fuel processor, the hot combustion gases from the burner assembly will be delivered via suitable heat transfer conduits to the fuel processor or other portion(s) of the system(s) to be heated.

As indicated in dashed lines in FIG. 1, fuel processors 12 and/or fuel-processing assemblies 10 according to the present disclosure may include a vaporization region 69 that is adapted to receive a liquid feed stream 16 (or a liquid component of a feed stream 16, such as a stream of water 17 and/or a stream of a liquid carbon-containing feedstock 18) and to vaporize the feed stream (or portion thereof) prior to delivery to hydrogen-producing region 19 of fuel processor 12. As indicated schematically in FIG. 1 in dashed lines, heated combustion stream 66 from the heating assembly may be used to vaporize the feed stream in vaporization region 69 and/or otherwise heat the feed stream. It is within the scope of the disclosure that fuel processor 12 may be constructed without a vaporization region and/or that the fuel processor may be adapted to receive a feed stream that is gaseous or that has already been vaporized. It is also within the scope of the present disclosure that vaporization region 69, when present, extends partially or completely outside of shell 68 (when present). It is further within the scope of the present disclosure that the vaporization region is contained in the same internal enclosure or chamber as catalyst 23, such as indicated in a dash-dot line in FIG. 1. In such a configuration, the vaporization region will be positioned upstream from the reforming catalyst so that the feed stream(s) will flow through the vaporization region prior to reaching the reforming catalyst.

In many applications, it may be desirable for fuel processor 12 and/or fuel-processing assembly 10 to produce a product hydrogen stream 14 containing at least substantially pure hydrogen gas. Accordingly, the fuel processor may utilize a process that inherently produces sufficiently pure hydrogen gas. When the output stream contains sufficiently pure hydrogen gas and/or sufficiently low concentrations of one or more non-hydrogen components for a particular application, product hydrogen stream 14 may be formed directly from output stream 20. However, in many hydrogen-producing processes, output stream 20 will be a mixed gas stream that contains hydrogen gas as a majority component along with other gases. Similarly, in many applications, the output stream 20 may be substantially pure hydrogen but still contain concentrations of one or more non-hydrogen components that are harmful or otherwise undesirable in the application for which the product hydrogen stream is intended to be used.

Accordingly, fuel-processing assembly 10 may (but is not required to) further include a purification region 24, in which a hydrogen-rich stream 26 is produced from the output, or mixed gas, stream. Hydrogen-rich stream 26 contains at least one of a greater hydrogen concentration than output stream 20 and a reduced concentration of one or more of the other gases or impurities that were present in the output stream. Purification region 24 is schematically illustrated in FIG. 1, where output stream 20 is shown being delivered to an optional purification region 24. As shown in FIG. 1, at least a portion of hydrogen-rich stream 26 forms product hydrogen stream 14. Accordingly, hydrogen-rich stream 26 and product hydrogen stream 14 may be the same stream and have the same compositions and flow rates. However, it is also within the scope of the present disclosure that some of the purified hydrogen gas in hydrogen-rich stream 26 may be stored for later use, such as in a suitable hydrogen storage assembly, subjected to a further purification process, and/or consumed by the fuel-processing assembly (such as for use as a fuel stream for a heating assembly).

Purification region 24 may, but is not required to, produce at least one byproduct stream 28. When present, byproduct stream 28 may be exhausted, sent to a burner assembly or other combustion source (such as heating assembly 60 as schematically indicated at 25 in FIG. 1), used as a heated fluid stream, stored for later use, or otherwise utilized, stored or disposed of. It is within the scope of the present disclosure that byproduct stream 28 may be emitted from the purification region as a continuous stream responsive to the delivery of output stream 20 to the purification region, or intermittently, such as in a batch process or when the byproduct portion of the output stream is retained at least temporarily in the purification region. When purification region 24 produces a byproduct stream 28, the purification region may additionally or alternatively be referred to as a separation region, as the region separates the (mixed gas) output stream 20 into hydrogen-rich stream 26 and byproduct stream 28.

Purification region 24 includes any suitable device, or combination of devices, that are adapted to reduce the concentration of at least one component of output stream 20. In most applications, hydrogen-rich stream 26 will have a greater hydrogen concentration than output, or mixed gas, stream 20. However, it is also within the scope of the present disclosure that the hydrogen-rich stream will have a reduced concentration of one or more non-hydrogen components that were present in output stream 20, yet have the same, or even a reduced, overall hydrogen concentration as the output stream. For example, in some applications where product hydrogen stream 14 may be used, certain impurities, or non-hydrogen components, are more harmful than others. As a specific example, in many conventional fuel cell systems (such as proton exchange membrane fuel cell systems), carbon monoxide may damage a fuel cell stack if it is present in even a few parts per million, while other non-hydrogen components that may be present in stream 20, such as water, will not damage the stack even if present in much greater concentrations. Therefore, in such an application, a suitable purification region may not increase the overall hydrogen concentration, but it will reduce the concentration of a non-hydrogen component that is harmful, or potentially harmful, to the desired application for the product hydrogen stream.

Illustrative, non-exclusive examples of suitable devices for purification region 24 include one or more hydrogen-selective membranes 30, chemical carbon monoxide removal assemblies 32, and pressure swing adsorption systems 38. It is within the scope of the present disclosure that purification region 24 may include more than one type of purification device and that these devices may have the same or different structures and/or may operate by the same or different mechanisms.

Hydrogen-selective membranes 30 are permeable to hydrogen gas, but are at least substantially, if not completely, impermeable to other components of output stream 20. Membranes 30 may be formed of any hydrogen-permeable material suitable for use in the operating environment and parameters in which purification region 24 is operated Examples of suitable materials for membranes 30 include palladium and palladium alloys, and especially thin films of such metals and metal alloys. Palladium alloys have proven particularly effective, especially palladium with 35 wt % to 45 wt % copper. A palladium-copper alloy that contains approximately 40 wt % copper has proven particularly effective, although other relative concentrations and components may be used within the scope of the disclosure.

Hydrogen-selective membranes are typically very thin, such as a thin foil that is approximately 0.001 inches thick. It is within the scope of the present disclosure, however, that the membranes may be formed from other hydrogen-permeable and/or hydrogen-selective materials, including metals and metal alloys other than those discussed herein as well as non-metallic materials and compositions, and that the membranes may have thicknesses that are greater or less than discussed herein. For example, the membrane may be made thinner, with commensurate increase in hydrogen flux. Examples of suitable mechanisms for reducing the thickness of the membranes include rolling, sputtering and etching. Examples of various membranes, membrane configurations, and methods for preparing the same are disclosed in U.S. Pat. Nos. 6,221,117, 6,319,306, and 6,537,352, the complete disclosures of which are hereby incorporated by reference.

Chemical carbon monoxide removal assemblies 32 are devices that chemically react carbon monoxide and/or other undesirable components of stream 20, if present in output stream 20, to form other compositions that are not as potentially harmful. Examples of chemical carbon monoxide removal assemblies include water-gas shift reactors and other devices that convert carbon monoxide to carbon dioxide, and methanation catalyst beds that convert carbon monoxide and hydrogen to methane and water. It is within the scope of the disclosure that fuel processing assembly 10 may include more than one type and/or number of chemical removal assemblies 32.

Pressure swing adsorption (PSA) is a chemical process in which gaseous impurities are removed from output stream 20 based on the principle that certain gases, under the proper conditions of temperature and pressure, will be adsorbed onto an adsorbent material more strongly than other gases. Typically, it is the impurities that are adsorbed and removed from output stream 20. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are removed from stream 20 along with other impurities. If the adsorbent material is going to be regenerated and these impurities are present in stream 20, purification region 24 preferably includes a suitable device that is adapted to remove these impurities prior to delivery of stream 20 to the adsorbent material because it is more difficult to desorb these impurities.

Adsorption of impurity gases occurs at elevated pressure When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. Other suitable adsorbent material compositions, forms, and configurations may be used.

PSA system 38 also provides an example of a device for use in purification region 24 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 24 is shown in dashed lines within fuel processor 12. It is within the scope of the present disclosure that purification region 24, when present, may alternatively be separately located downstream from the fuel processor, such as either coupled directly to the optional shell 68 or spaced-away from the shell, as schematically illustrated in dash-dot lines in FIG. 1. It is also within the scope of the present disclosure that purification region 24 may include portions within fuel processor 12 and portions external fuel processor 12. It is further within the scope of the present disclosure that purification region 24 may be enclosed within the same internal enclosure or chamber as catalyst 23, such as indicated schematically with a dash-dot line in FIG. 1. In such a configuration, the purification region should be located downstream from catalyst 23 so that the purification region receives the hydrogen-containing mixed gas stream that is produced by catalyst 23.

In the context of a fuel processor, or fuel processing assembly, that is adapted to produce a product hydrogen stream that will be used as a feed, or fuel, stream for a fuel cell stack, the fuel processor may be adapted to produce substantially pure hydrogen gas, or even pure hydrogen gas. For the purposes of the present disclosure, substantially pure hydrogen gas refers to hydrogen gas that is greater than 90% pure, and which may be greater than 95% pure, greater than 99% pure, and even greater than 99.5% pure. Suitable fuel processors and fuel-processing assemblies, including illustrative, non-exclusive examples of components and configurations thereof for producing streams of at least substantially pure hydrogen gas are disclosed in U.S. Pat. Nos. 6,319,306, 6,221,117, 5,997,594, 5,861,137, and U.S. Patent Application Publication Nos. 2001/0045061, 2003/0192251, 2003/0223926, 2006/0090397, and 2007/0062116, the complete disclosures of which are hereby incorporated by reference.

Figure 2:
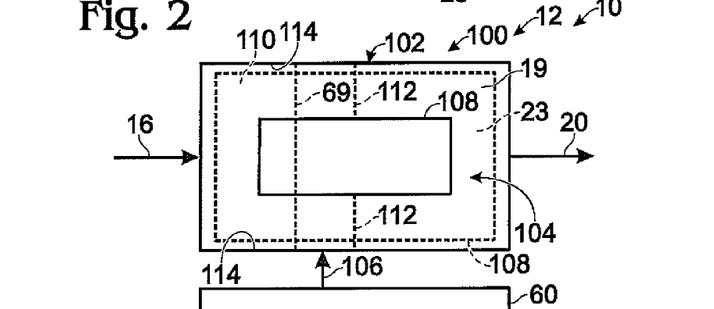
FIG. 2 is a schematic diagram of hydrogen-producing assemblies including hydrogen-producing regions according to the present disclosure.

Illustrative, non-exclusive examples of at least a portion of a hydrogen-producing assembly 12 of a fuel-processing assembly 10 according to the present disclosure are schematically represented in FIG. 2 and indicated generally at 100. Hydrogen-producing assembly 100 is adapted to receive a feed stream 16 and to produce a reformate mixed-gas stream 20 therefrom for delivery to downstream components of the fuel-processing assembly. Hydrogen-producing assembly 100 includes a catalyst chamber 102 that defines an internal volume 104, a heating assembly 60 adjacent the catalyst chamber and adapted to heat the catalyst chamber to at least a minimum hydrogen-producing temperature (and/or to a predetermined hydrogen-producing temperature or range of temperatures), a hydrogen-producing region 19 within the internal volume, and a conductive guide structure 108 positioned within the internal volume. Heating assembly 60 may additionally or alternatively be referred to as a heat source 60.

Hydrogen-producing region 19 of assembly 100 includes a volume, or quantity, of catalyst 23 that is adapted to catalyze production of the reformate mixed-gas stream 20 from the feed stream 16. In some embodiments, though not required to all embodiments, a vaporization region 69 also may be positioned within the internal volume of the catalyst chamber, as indicated in dashed lines in FIG. 2. Accordingly, the vaporization region may be described as being fluidly coupled to the hydrogen-producing region. For example, the vaporization region may be adapted to receive the feed stream in a liquid state and to at least partially vaporize the feed stream prior to delivery of the feed stream to the hydrogen-producing region. Because both the hydrogen-producing region and the vaporization region may be positioned within the same housing or shell (e.g., catalyst chamber 102), both may be heated by the same heating assembly (or heat source) 60. It is within the scope of the present disclosure that more than one, including two or more, heat sources and/or heating assemblies may be utilized to heat the hydrogen-producing region and/or vaporization region of a fuel processing assembly. An illustrative, non-exclusive example of a heat source that may be utilized with a hydrogen-producing assembly 100 is a heat source that is adapted to combust a fuel and to produce a heat stream 106 to heat the catalyst chamber to at least a minimum hydrogen-producing temperature. Heat stream 106 may additionally or alternatively be referred to as a heated exhaust stream.

Vaporization region 69, when present, may include a quantity, or bed, of vaporization material, or vaporization media, 110 that is adapted to conduct heat from the heat source across and throughout the vaporization region so that the feed stream in a liquid state reaches a vaporization temperature and accordingly vaporizes prior to entering the hydrogen-producing region in a gas-phase. An illustrative, non-exclusive example of a suitable vaporization material is metallic or other heat-conductive particulate that at least partially, at least substantially, or completely fills the portion of the internal volume comprising the vaporization region to define a vaporization bed, or chamber, through which the feed stream(s) flow. Illustrative, non-exclusive examples of such particulate include stainless steel shot and pellets. It is within the scope of the present disclosure that vaporization region 69 may utilize other materials and/or constructions. It is within the scope of the present disclosure that a vaporization region external to the internal volume, and thus the catalyst chamber, also may be utilized in hydrogen-producing assemblies 12 and fuel-processing assemblies 10 according to the present disclosure.

Conductive guide structure 108 is adapted to conduct and distribute heat from the heat source to (and through) at least the hydrogen-producing region and to direct the feed stream and the reformate mixed-gas stream as they flow through the hydrogen-producing region. In embodiments including a vaporization region positioned within the internal volume, the guide structure may (but is not required to) further conduct and distribute heat from the heat source to and through the vaporization region and to direct at least the feed stream(s) through the vaporization region.

Conductive guide structure 108 may include any suitable structure that is positioned within the internal volume and adapted to conduct and distribute heat from the heat source through, and/or across, at least the hydrogen-producing region and to direct the feed stream and the reformate mixed-gas stream as they flow through the hydrogen-producing region. Accordingly, conductive guide structure 108 should be formed from a suitable material (or combination of materials) and should have sufficient mass to distribute heat through and/or across the internal volume. Conductive guide structure may be formed from any suitable material that has the heat-conductive properties discussed herein and which is chemically and thermally stable in the operating conditions to which the guide structure is exposed during use of the hydrogen-producing fuel processing assembly to produce hydrogen gas. Illustrative, non-exclusive examples of suitable materials include stainless steel (such as SS304), copper, and Inconel 625 and 800 alloys. In some embodiments, the conductive guide structure may be formed from the same material as the catalyst chamber's enclosure and/or from a material having the same or a similar coefficient of thermal expansion, although this is not required to all embodiments.

As discussed, the hydrogen-producing assembly produces hydrogen gas via a catalytic reaction, such as steam reforming, that is preferably performed at a suitable hydrogen-producing temperature, or range of temperatures. When the catalyst chamber is heated by the heated exhaust stream from a burner or other heating assembly, the catalyst within the chamber may be unevenly heated. For example, portions of the catalyst that are closer to the heating assembly may be heated to a greater temperature than portions of the catalyst that are spaced further away from the heating assembly. Additionally or alternatively, catalyst near the interior wall, or interior surface, 114 of the catalyst chamber may be heated to a higher temperature than catalyst near the center of the catalyst chamber A similar potential for position-related differential heating exists for the vaporization media, if used in a vaporization region 69.

By extending at least substantially, or even completely, across and through the catalyst region, conductive guide structure 108 distributes heat within the catalyst region Accordingly, the catalyst within the catalyst region should have a reduced temperature differential (between the hottest region of catalyst and the coldest region of catalyst) than if conductive guide structure 108 was not present. In some embodiments, this temperature differential when the conductive guide structure is present may be at least 10%, at least 20%, at least 30%, or at least 50% less than if the conductive guide structure was not present. Accordingly, by distributing heat through the catalyst region due to the conductive nature of the conductive guide structure, the guide structure enables a greater amount of the catalyst to be at a selected hydrogen-producing temperature, or temperature range. This may result in a greater conversion of the reactants to hydrogen gas and/or longer catalyst life.

By directing the feed stream as it flows through the hydrogen-producing region and/or the vaporization region, it is meant that the conductive guide structure directs fluid through the internal volume from an inlet to an outlet along a predetermined path, the fluid at least initially being the feed stream and then becoming the reformate mixed-gas stream as the fluid flows through the hydrogen-producing region. In other words, at various positions along the length of the internal volume between the inlet and the outlet, the fluid may be in the form of the feed stream, in the form of the reformate mixed-gas stream, and/or in the form of a mixture of the feed stream and the reformate mixed-gas stream when all of the feed stream has yet to chemically react to produce hydrogen gas and other gases therefrom. Additionally or alternatively, the reformate mixed-gas stream may include, or be described as including, portions of the feed stream that did not react to produce hydrogen gas and other gases therefrom prior to exiting the hydrogen-producing region and being delivered to downstream components of a fuel-processing assembly. In other words, the other gases of the reformate mixed-gas stream may include gases present in the feed stream that did not chemically react in the presence of the catalyst to produce hydrogen gas and other gases.

In some embodiments, and as indicated in dashed lines in FIG. 2, conductive guide structure 108 may be described as being generally coextensive with the internal volume. Stated differently, the conductive guide structure may (but is not required to) at least substantially span the internal volume of the catalyst chamber, but it is within the scope of the present disclosure that the conductive guide structure only partially span and/or not generally be coextensive with the internal volume of the catalyst chamber. Additionally or alternatively, the conductive guide structure may be described as spanning the internal volume along a plurality of axes. In some embodiments, the conductive guide structure may extend between opposed internal walls, or internal surfaces, of the catalyst chamber, such as by extending in physical contact with these opposed walls/surfaces. In some embodiments, the conductive guide structure also will extend at least through the entire catalyst region (or catalyst-containing region) of the catalyst chamber from at least a region where the reactants enter the catalyst-containing portion of the catalyst chamber to at least a region where the mixed gas stream exits the catalyst-containing portion of the catalyst chamber. It is within the scope of the present disclosure that the conductive guide structure may further extend beyond, or external, either or both of the length or thickness of the catalyst-containing region of the catalyst chamber and/or beyond the length of thickness of the internal volume.

Further additionally or alternatively, and as schematically indicated in dashed lines at 112 in FIG. 2, the conductive guide structure may be coupled or otherwise secured to an interior surface 114 of the catalyst chamber that defines the internal volume of the catalyst chamber. Interior surface 114 also may be described as generally facing the internal volume. The conductive guide structure may (but is not required to) be secured in contact with the interior surface of the catalyst chamber. Illustrative, non-exclusive examples of suitable securing methods include (but are not limited to) brazing and welding. In embodiments that include an optional vaporization region within the internal volume, the conductive guide structure may be positioned solely within the hydrogen-producing region or within both the hydrogen-producing region and the vaporization region as schematically illustrated in FIG. 2.

Additionally or alternatively, the conductive guide structure may be described as providing a mechanism or structure for generally ensuring that at least a substantial portion of the catalyst is contacted by the feed stream and/or the reformate mixed-gas stream as they flow through the hydrogen-producing region, for example, to increase the effectiveness of the hydrogen-producing region and thus the production of hydrogen gas from the feed stream. Additionally or alternatively, in embodiments including a vaporization region through which the conductive guide structure extends, the conductive guide structure may be described as providing a mechanism or structure for generally ensuring that at least a substantial portion of the vaporization media is contacted by the feed stream, for example, to increase the effectiveness of the vaporization region and thus the completeness of the vaporization of the feed stream. This increase in effectiveness may be described as resulting from an increase in at least one of the residence time and the space velocity of the corresponding fluid stream in the corresponding vaporization and/or hydrogen-producing region. By forcing the gas stream to flow along a longer path than if the conductive guide structure was not present, the conductive guide structure may increase the period of time in which the fluids are in contact with the vaporizing media and/or increase the rate at which the fluids flow through the corresponding region(s). Furthermore, by defining a particular path of travel through the reforming catalyst in the hydrogen producing region and/or the vaporization media in the vaporization region, the conductive guide structure may provide increased contact and/or distribution of the fluids with the catalyst and/or vaporization media.

Additionally or alternatively, the conductive guide structure may be described as providing a mechanism or structure for inducing turbulence in the flow of the feed stream and the reformate mixed-gas stream as they flow through the internal volume of the catalyst chamber. Further additionally or alternatively, the conductive guide structure may be described as providing a mechanism or structure that induces a non-linear flow path of the feed stream and the reformate mixed-gas stream as they flow through the internal volume of the catalyst chamber. Still further additionally or alternatively, the conductive guide structure may be described as inducing a predetermined flow of the feed stream and the reformate mixed-gas stream such that the fluid flow effectively scrubs the interior surface of the catalyst chamber, for example, to deter, and in some cases even prevent, the buildup of coke, or other deposits and/or side-effects that may result from a steam reforming or other hydrogen-producing process, on the interior surface of the catalyst chamber. The induced fluid flow may further deter or even prevent the buildup of deposits on the catalyst itself Additionally or alternatively, in embodiments including a vaporization region within the internal volume and including a conductive guide structure that at least partially extends into the vaporization region, the induced fluid flow may further deter or even prevent the buildup of deposits on the vaporization material.

Figure 3:
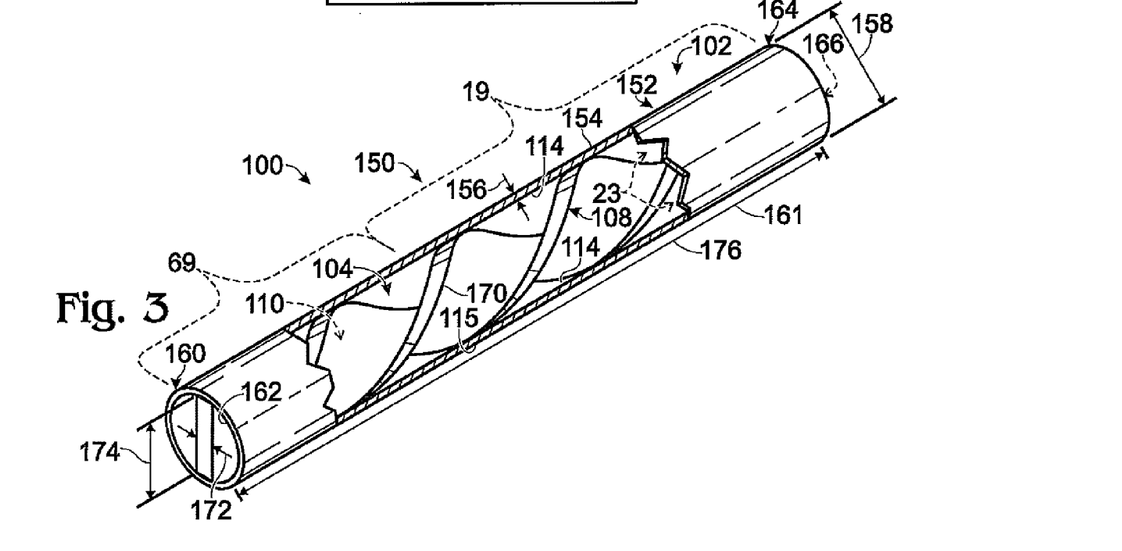
FIG. 3 is a fragmentary perspective view of an illustrative, non-exclusive example of a portion of a hydrogen-producing assembly according to the present disclosure, the assembly including a catalyst chamber and a helical conductive guide structure positioned within the catalyst chamber.

An illustrative, non-exclusive example of a portion of a hydrogen-producing assembly 100 is shown in FIG. 3 and generally indicated at 150. Assembly 150 includes a catalyst chamber 102 and a conductive guide structure 108. The catalyst chamber of assembly 150 may be described as a cylindrical catalyst chamber 152 defined by a wall, or wall structure, 154. However, other shapes may be used. Regardless of the cross-sectional shape of the catalyst chamber, the wall structure includes an interior surface 114, an exterior surface 115, and a thickness 156 that is measured between the interior and exterior surfaces. The cylindrical catalyst chamber has a diameter 158 and a length 161. Wall 154 may be described as defining the internal volume 104 of the chamber 152. Cylindrical catalyst chamber 152 has a first end region 160 defining an inlet 162 for receiving a feed stream into the internal volume from a feedstock delivery system, and a second end region 164 defining an outlet 166 for delivering the reformate mixed-gas stream from the internal volume to downstream components of a fuel-processing assembly. The first end region may additionally or alternatively be referred to as an inlet, or an inlet end region, and the second end region may additionally or alternatively be referred to as an outlet, or an outlet end region.

As schematically illustrated in FIG. 3, the internal volume of the chamber 162 would typically include a volume of catalyst 23 within a hydrogen-producing region 19 of the internal volume, and as also schematically illustrated in dashed lines in FIG. 3, the internal volume may include a vaporization region 69 generally adjacent inlet 162 and a hydrogen-producing region 19 generally adjacent the outlet 166. As schematically illustrated at 110, vaporization region 69 may include vaporization media, or vaporization material, within the internal volume of chamber 152. Accordingly, when the feed stream enters the internal volume through the inlet of the cylindrical catalyst chamber 152 of assembly 150, the feed stream would first flow through the optional vaporization region before entering the hydrogen-producing region, where the feed stream would catalyze to form the reformate mixed-gas stream as it flows through the hydrogen-producing region and subsequently out the outlet. Additionally or alternatively, as discussed, in embodiments not including a vaporization region, the hydrogen-producing region may span generally the entire length of the internal volume, from the inlet to the outlet.

In the illustrative, non-exclusive example shown in FIG. 3, the conductive guide structure 108 of assembly 150 is in the form of a helical member 170 extending through the internal volume of the cylindrical catalyst chamber 152. Accordingly, conductive guide structures according to the present disclosure may be adapted to direct the feed stream and the reformate mixed-gas stream in a helical path as they flow through the hydrogen-producing region and/or an optional vaporization region. Stated differently, conductive guide structures according to the present disclosure may be adapted to direct the feed stream and the reformate mixed-gas stream in a spiraling motion as they flow through the hydrogen-producing region and/or the optional vaporization region.

Helical member 170 has a generally rectangular cross-section that has a thickness 172 and a width 174, although other cross-sectional shapes are within the scope of the present disclosure. Width 174 also may be described as defining the diameter of the helical member 170. Helical member 170 also has a length 176, which in the illustrated embodiment, corresponds (substantially or completely) to the length of the catalyst chamber 152; however, other configurations are within the scope of the present disclosure. In other words, in the illustrative non-exclusive example of a conductive guide structure in FIG. 3, the structure is sized to span the entire length of the catalyst chamber. In embodiments of assemblies 150 including an optional vaporization region within the internal volume of the catalyst chamber, the helical member may extend through the vaporization region as well as through the hydrogen-producing region.

The thickness 172 and width/diameter 174 of a helical member 170 according to the present disclosure may be selected based upon such factors as one or more of the material of the helical member, the desired conductivity of the helical member, the temperature or range of temperatures of an associated heat source, the size, shape, and/or dimensions of an associated catalyst chamber, and/or any other appropriate criteria. Illustrative, non-exclusive examples of helical members according to the present disclosure include members having a thickness that is at least 10%, at least 20%, or at least 30% of its diameter; members having a thickness in the range of 10-30%, 15-30%, or 20-30% of its diameter; and members having a thickness that is greater than, substantially greater than, at least twice as thick, at least three times as thick, between about two and about four times as thick, greater than twice as thick, greater than three times as thick, or greater than four times as thick as the thickness of the wall of the associated catalyst chamber through which the helical member extends. Other configurations of helical members are within the scope of the present disclosure, and helical members are not limited to the disclosed ranges.

Helical member 170 is illustrated in FIG. 3 as including two full twists along its length; however, conductive guide structures according to the present disclosure in the form of a helical member may have any suitable number of twists or portions thereof. Illustrative, non-exclusive examples of helical members may include less than one twist, between about one and about three twists, at least two twists, between about two and about four twists, at least one twist, at least two twists, at least three twists, or any other suitable number of twists and/or portions thereof as may be appropriate for a particular configuration of a hydrogen-producing assembly 100 according to the present disclosure. Helical member 170 may be formed by twisting a rectangular prism of material a desired number of twists. Other methods are within the scope of the present disclosure including (but not limited to) casting, forming, forging, machining, etc. The number of twists of a helical member may be based upon such factors as the length of the helical member, the width of the helical member, the material of the helical member, the thickness of the helical member, the conductivity of the helical member, the temperature or range of temperatures of an associated heat source, the size, shape, and/or dimensions of an associated catalyst chamber, etc. Illustrative, non-exclusive examples of helical members may include at least two twists per eight inches of length of the helical member and between about one and about three twists per eight inches of length of the helical member. Other configurations may be used and are within the scope of the present disclosure.

Figure 4:
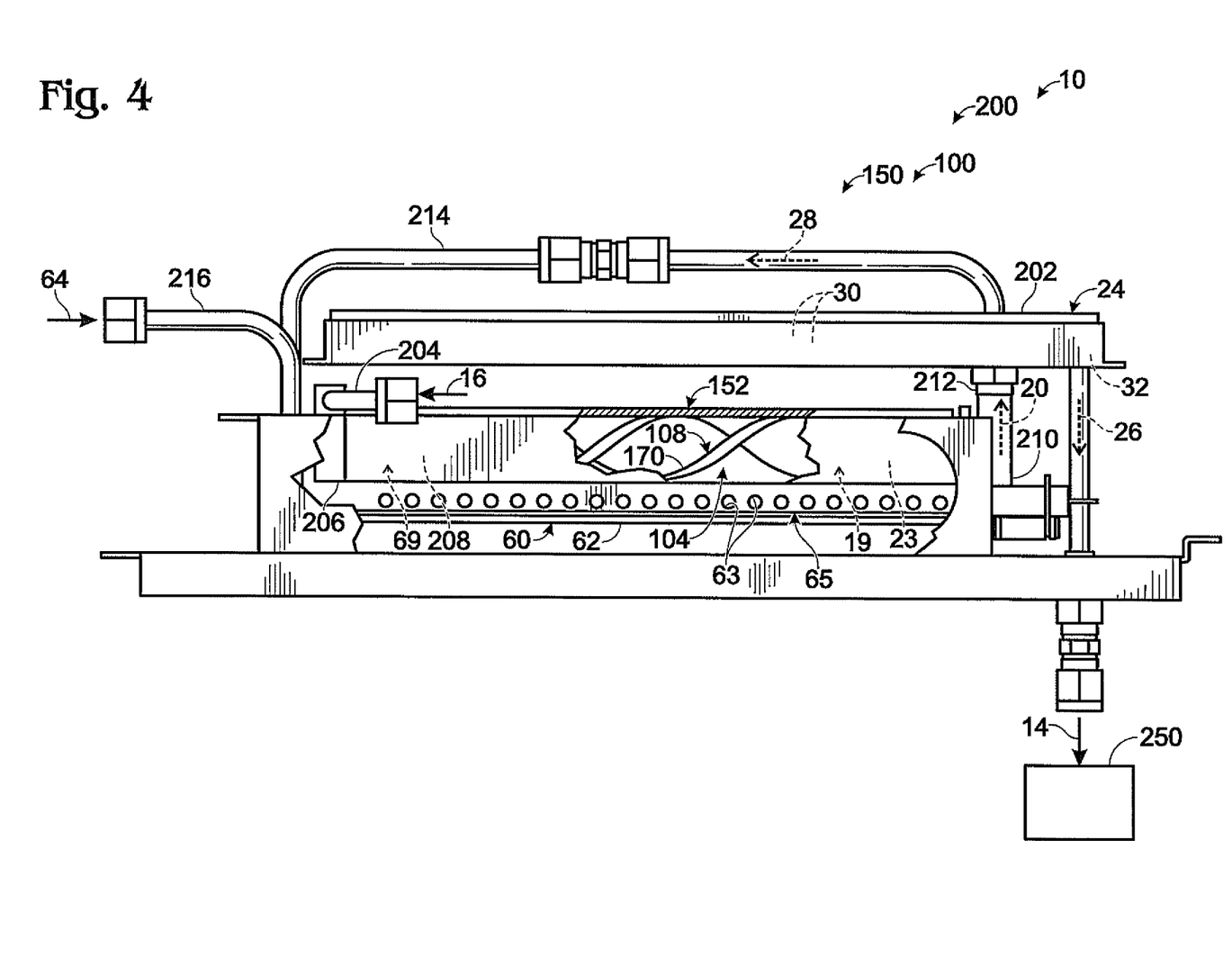
FIG. 4 is a fragmentary side plan view of an illustrative, non-exclusive example of a fuel-processing assembly according to the present disclosure, the assembly including the hydrogen-producing assembly of FIG. 3.

Another illustrative, non-exclusive example of a fuel-processing assembly 10 that includes a hydrogen-producing assembly 150 having a cylindrical catalyst chamber 152 and a conductive guide structure 108 in the form of a helical member 170 is illustrated in FIG. 4, and indicated generally at 200. Assembly 200 further includes a heating assembly 60 in the form of a burner assembly 62 adjacent the catalyst chamber and adapted to produce a heat stream (or heated exhaust stream) directed at the catalyst chamber, such as to heat the catalyst chamber, or at least the hydrogen-producing region thereof, to at least a minimum hydrogen-producing temperature, illustrative examples of which are described herein. As illustrated in the non-exclusive example shown in FIG. 4, the burner assembly includes a plurality of air inlets 63 from an air manifold 65 that distributes air to the burner assembly to support combustion to produce a heat stream along at least the hydrogen-producing region of the catalyst chamber. As also illustrated in the example of FIG. 4, the fuel processing assembly includes a hydrogen-purification region 24 in the form of a hydrogen-purification assembly 202 having a plurality of hydrogen-selective membranes 30.

In the depicted example, the hydrogen-producing assembly 150 receives a feed stream 16 via a feed line 204. The feed line delivers the feed stream to the internal volume 104 of the cylindrical catalyst chamber 152 via an inlet manifold 206. The illustrated example includes a vaporization region 69 having a bed of stainless steel shot 208 adapted to conduct heat from the heat source. Accordingly, as the feed stream flows through the vaporization region, the flow being directed by the helical member 170, the feed stream is vaporized. Thereafter, the vaporized feed stream enters the hydrogen-producing region 19 of the internal volume including a bed of steam reforming catalyst 23. As the feed stream flows through the catalyst bed, the flow being directed by the helical member 170, the catalyst causes the feed stream to chemically react to produce a reformate mixed-gas stream 20 containing hydrogen gas and other gases. The mixed-gas stream is then delivered, via an outlet manifold 210 and mixed-gas line 212, to the hydrogen-purification assembly 202, which in the illustrated example is schematically illustrated as including at least one hydrogen-selective membrane 30 and optionally at least one chemical carbon dioxide removal assembly 32, such as a methanation catalyst bed. As discussed, it is within the scope of the present disclosure that other purification assemblies may additionally or alternatively be used, and that no purification assembly may be used.

Purification assembly 202 separates the reformate mixed-gas stream into a hydrogen-rich stream 26, which may form product stream 14, and a byproduct stream 28. The hydrogen-rich stream 26 may then be delivered to further downstream components of a fuel-processing assembly or to any other appropriate device where hydrogen gas is utilized. As discussed, one such downstream component is a fuel cell stack, such as schematically illustrated at 250 in FIG. 4. In the fuel cell stack, the hydrogen gas in product hydrogen stream 14 reacts with an oxidant, such as air, to produce an electrical output. When a fuel processing assembly according to the present disclosure includes or is in fluid communication with a fuel cell stack, the fuel processing assembly may be referred to as a fuel cell system or a hydrogen-producing fuel cell system.

In the illustrated, non-exclusive example, byproduct stream 28 is delivered to the burner assembly 62 via a first fuel line 214 to be combusted therein. The burner assembly also may receive fuel 64 from a fuel source via a second fuel line 216, for example, during initial startup of assembly 200 and prior to the sufficient production of a byproduct stream 28 to maintain a suitable temperature range for the vaporization and the reformation of the feed stream.

In experiments using the hydrogen-producing fuel processing assembly of FIG. 4 with a steam reforming catalyst 23 that receives a feed stream of methanol and water at a flow rate of 8 ml/min, the fuel processor produced 4.45 slm (standard liters per minute) of hydrogen gas in product stream 14 and thereby converted approximately 97% of the carbon-containing feedstock (i.e., methanol) to hydrogen gas. In a corresponding example in which the conductive guide structure was not present, the product stream contained 3.11 slm of hydrogen gas, and thus the conversion was only approximately 83%.

The depicted example of FIG. 4 and the corresponding experimental data described above are intended for the purpose of illustration, and not limitation, in that many other embodiments are within the scope of the present disclosure, such as described, illustrated, and/or incorporated elsewhere herein.

INDUSTRIAL APPLICABILITY

The hydrogen-producing assemblies disclosed herein are applicable to the hydrogen-generation and energy-production industries.

In the event that any of the references that are incorporated by reference herein define a term in a manner or are otherwise inconsistent with either the non-incorporated disclosure of the present application or with any of the other incorporated references, the non-incorporated disclosure of the present application shall control, with the term or terms as used therein only controlling with respect to the patent document in which the term or terms are defined.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

The invention claimed is:

1. A hydrogen-producing assembly, comprising:
a catalyst chamber defining an internal volume and including an inlet for receiving a feed stream and an outlet for delivering a reformate mixed-gas stream containing hydrogen gas and other gases produced from the feed stream in the catalyst chamber, wherein the hydrogen gas is a majority component of the reformate mixed-gas stream;
a heat source adjacent the catalyst chamber and adapted to heat the catalyst chamber to at least a minimum hydrogen-producing temperature;
a hydrogen-producing region within the internal volume, the hydrogen-producing region including a volume of catalyst adapted to catalyze production of the reformate mixed-gas stream from the feed stream via an endothermic reaction; and
a conductive guide structure positioned within the internal volume and adapted to conduct and distribute heat from the heat source to and within the hydrogen-producing region and to direct the feed stream and the reformate mixed-gas stream through at least the hydrogen-producing region of the internal volume.

2. The hydrogen-producing assembly of claim 1, wherein the conductive guide structure is adapted to direct the feed stream and the reformate mixed-gas stream in a spiraling path through the hydrogen-producing region.

3. The hydrogen-producing assembly of claim 1, wherein the conductive guide structure is adapted to direct the feed stream and the reformate mixed-gas stream along a helical path through the hydrogen-producing region.

4. The hydrogen-producing assembly of claim 1, wherein the heat source is adapted to combust a fuel and to produce a heat stream directed at the catalyst chamber to heat at least the hydrogen-producing region to at least a minimum hydrogen-producing temperature.

5. The hydrogen-producing assembly of claim 1, further comprising a hydrogen-purification region coupled to the hydrogen-producing region and adapted to receive the reformate mixed-gas stream from the hydrogen-producing region and to separate the reformate mixed-gas stream into a permeate stream and a byproduct stream, wherein the permeate stream has at least one of a greater concentration of hydrogen gas and a lower concentration of the other gases than the reformate mixed-gas stream, and further wherein the byproduct stream contains at least a substantial portion of the other gases.

6. The hydrogen-producing assembly of claim 5, wherein the hydrogen-purification region includes at least one hydrogen-selective membrane.

7. The hydrogen-producing assembly of claim 5, wherein the hydrogen-purification region includes a pressure swing adsorption assembly.

8. The hydrogen-producing assembly of claim 1 further comprising:
a vaporization region coupled to the hydrogen-producing region and adapted to receive the feed stream in a liquid state and to at least partially vaporize the feed stream prior to delivery of the feed stream to the hydrogen-producing region.

9. The hydrogen-producing assembly of claim 8, wherein the vaporization region is within the internal volume.

10. The hydrogen-producing assembly of claim 8, wherein the vaporization region is external to the catalyst chamber.

11. The hydrogen-producing assembly of claim 1, wherein the conductive guide structure includes a helical member extending through the hydrogen-producing region, the helical member adapted to conduct and distribute heat from the heat source to and within the hydrogen-producing region and to direct the feed stream and the reformate mixed-gas stream in a helical path through the hydrogen-producing region.

12. The hydrogen-producing assembly of claim 11, further comprising:
a vaporization region coupled to the hydrogen-producing region and adapted to receive the feed stream in a liquid state and to at least partially vaporize the feed stream prior to delivery of the feed stream to the hydrogen-producing region, and further wherein the helical member further extends through the vaporization region.

13. The hydrogen-producing assembly of claim 11, wherein the helical member is generally coextensive in length and width with the internal volume.

14. The hydrogen-producing assembly of claim 13, wherein the catalyst chamber includes an interior surface that generally defines the internal volume and wherein the helical member engages generally opposed regions of the interior surface.

15. The hydrogen-producing assembly of claim 14, wherein the helical member is secured in contact with the interior surface.

16. The hydrogen-producing assembly of claim 11, wherein the helical member includes at least 2 twists.

17. The hydrogen-producing assembly of claim 11, wherein the helical member includes at least one twist per 4 inches of length.

18. The hydrogen-producing assembly of claim 11, wherein the helical member includes between 1 and 3 twists per 8 inches of length.

19. The hydrogen-producing assembly of claim 11, wherein the helical member has a diameter and a thickness, and wherein the thickness is at least 20% of the diameter.

20. The hydrogen-producing assembly of claim 11, wherein the helical member has a diameter and a thickness, and wherein the thickness is between 15 and 30% of the diameter.

21. The hydrogen-producing assembly of claim 11, wherein the catalyst chamber includes a wall structure that defines the internal volume, the wall structure having an interior surface, and an exterior surface, and a thickness measured between the interior surface and the exterior surface, and further wherein the helical member has a thickness that is greater than the thickness of the wall structure of the catalyst chamber.

22. The hydrogen-producing assembly of claim 1, wherein the conductive guide structure spans the internal volume along a plurality of axes.

23. The hydrogen-producing assembly of claim 1, wherein the catalyst chamber includes an interior surface facing the internal volume, and wherein the conductive guide structure is adapted to direct the feed stream and the reformate mixed-gas stream along a flow path in which the streams scrub the catalyst and the interior surface of the catalyst chamber, thereby deterring buildup of coke thereon.

24. A hydrogen-producing assembly, comprising:
a catalyst chamber defining an internal volume and including an interior surface facing the internal volume, an inlet for receiving a feed stream, and an outlet for a reformate mixed-gas stream containing hydrogen gas and other gases produced in the internal volume, wherein the hydrogen gas is a majority component of the reformate mixed-gas stream;
a heat source adjacent the catalyst chamber and adapted to heat the catalyst chamber to at least a minimum hydrogen-producing temperature; and
a hydrogen-producing region within the internal volume, the hydrogen-producing region including a volume of catalyst adapted to catalyze production of the reformate mixed-gas stream from the feed stream, wherein the hydrogen-producing region is adapted to direct the feed stream and the reformate mixed-gas stream through the hydrogen-producing region so that the streams scrub the catalyst and the interior surface of the catalyst chamber, thereby preventing buildup of coke thereon.

25. A hydrogen-producing assembly, comprising:
a catalyst chamber defining an internal volume and including an inlet for receiving a feed stream and an outlet for a reformate mixed-gas stream containing hydrogen gas and other gases produced in the internal volume, wherein the hydrogen gas is a majority component of the reformate mixed-gas stream;
a heat source adjacent the catalyst chamber and adapted to combust a fuel and produce a heat stream directed at the catalyst chamber to heat the catalyst chamber to at least a minimum hydrogen-producing temperature;
a vaporization region within the internal volume and adapted to receive the feed stream in a liquid state and to at least partially vaporize the feed stream;
a hydrogen-producing region adjacent the vaporization region within the internal volume and positioned to receive the feed stream from the vaporization region, the hydrogen-producing region including a volume of catalyst adapted to catalyze production of the reformate mixed-gas stream from the feed stream via an endothermic reaction;
a conductive guide structure positioned within the internal volume and spanning at least the hydrogen-producing region, the conductive guide structure adapted to conduct and distribute heat from the heat source to and through the hydrogen-producing region and to direct the feed stream and the reformate mixed-gas stream in a helical path through at least the hydrogen-producing region; and
a hydrogen-purification region coupled to the hydrogen-producing region and adapted to receive the reformate mixed-gas stream from the hydrogen-producing region and to separate the reformate mixed-gas stream into a permeate stream and the fuel, wherein the permeate stream has at least one of a greater concentration of hydrogen gas and a lower concentration of the other gases than the reformate mixed-gas stream, wherein the fuel contains at least a substantial portion of the other gases.

* * * * *